Jan. 4, 1944.  F. P. MASON  2,338,525
SYNCHRONOUS MOTOR
Filed Dec. 21, 1942  3 Sheets-Sheet 1
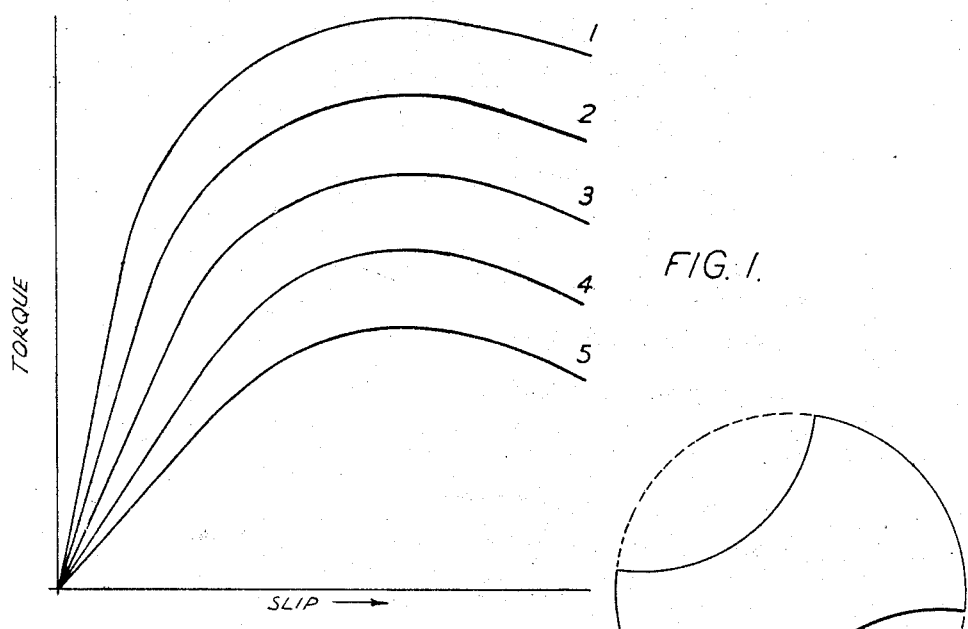
FIG. 1.
FIG. 13
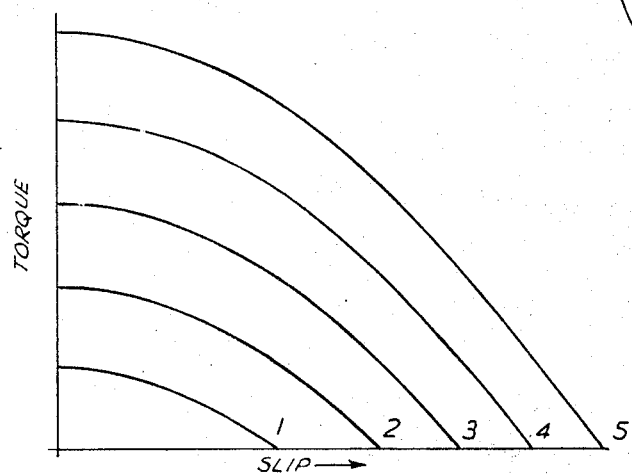
FIG. 2.
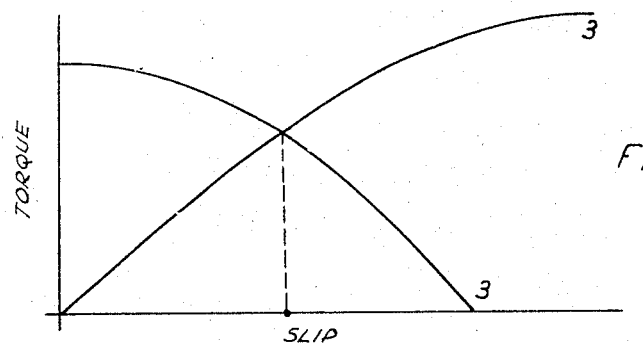
FIG. 3.
Inventor
F. P. Mason.
By James N. Curtin
Attorney

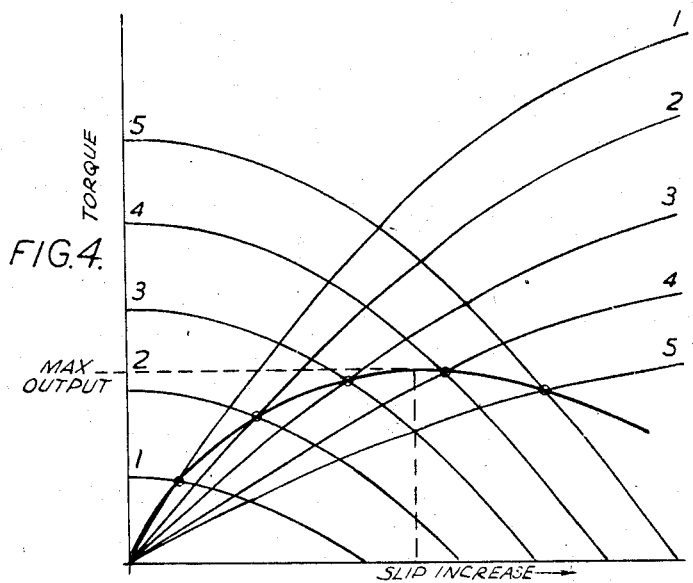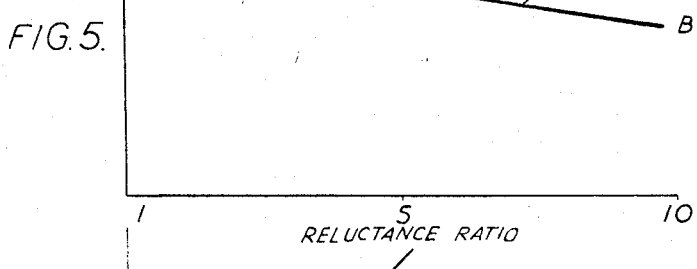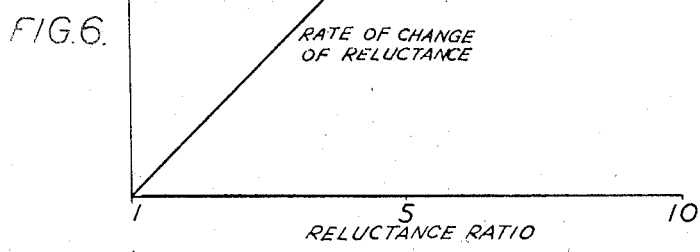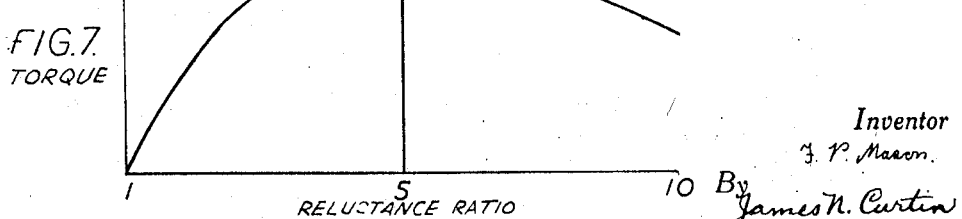

Jan. 4, 1944.                F. P. MASON                 2,338,525
                           SYNCHRONOUS MOTOR
                        Filed Dec. 21, 1942              3 Sheets-Sheet 3
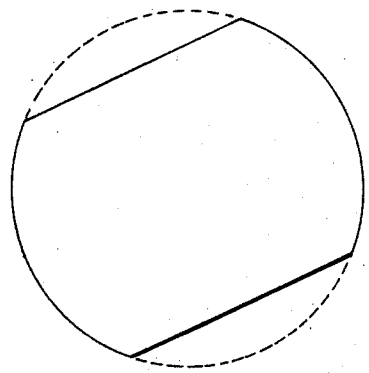
FIG. 12
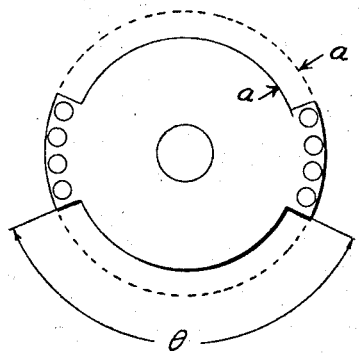
FIG. 8
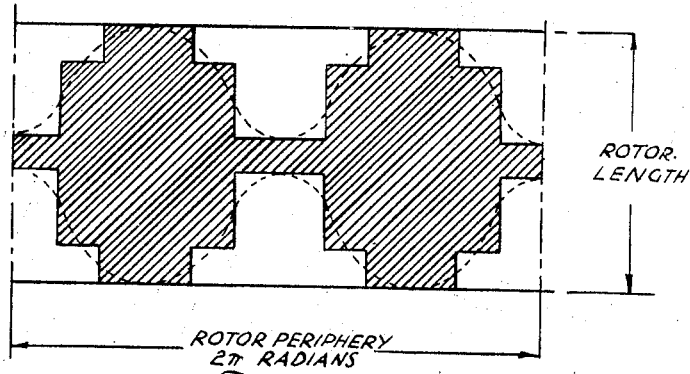
FIG. 9.
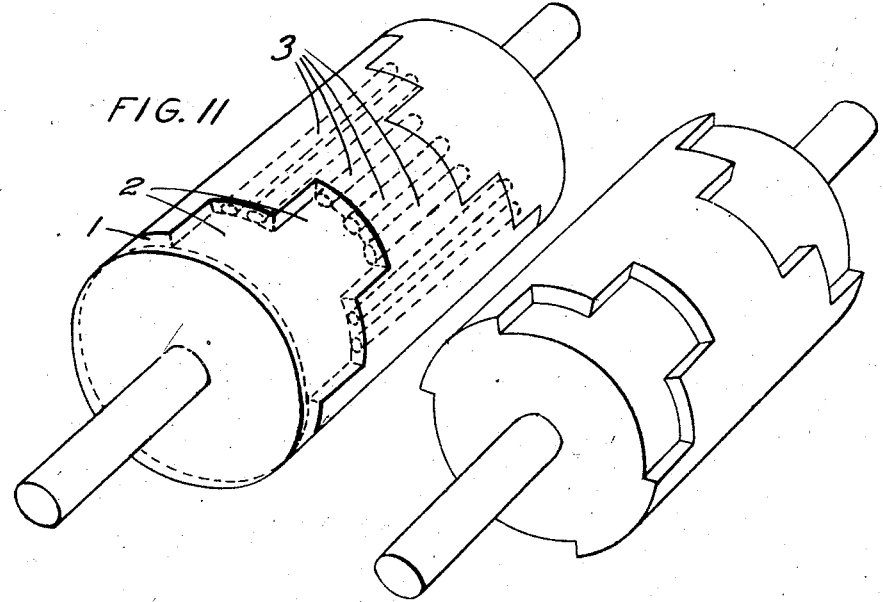
FIG. 11
FIG. 10
Inventor
F. P. Mason
By James N. Curtin
Attorney Patented Jan. 4, 1944

2,338,525

UNITED STATES PATENT OFFICE 2,338,525

SYNCHRONOUS MOTOR

Frederick Percival Mason, Croydon, England, assignor to Creed and Company Limited, Croydon, England Application December 21, 1942, Serial No. 469,686
In Great Britain November 7, 1941

3 Claims. (Cl. 172—120)

This invention relates to synchronous electric motors of the type that operate without continuous current excitation.

It is known that, in order to render synchronous electric motors of this type self-starting, they may be provided with windings so disposed in relationship to the flux that a torque is produced in a similar manner to that of an induction motor.

The provision of auxiliary starting windings in a synchronous motor results in some of the cubic content of the motor being allotted to the winding, so that there is less space for the iron and copper necessary to produce synchronous torque. Thus, starting torque may be obtained only at the expense of synchronous torque, in a given size of motor.

Further, the starting torque, being produced by the relative motion of the rotating field and rotor, has the characteristics of an induction motor torque, so that the motor is not accelerated completely to synchronous speed, but tends to operate at a sub-synchronous speed, at which the torque produced is equal to the torque required by the load. Therefore, the synchronous torque developed must be made sufficient to accelerate the mass of the rotor and the load to synchronous speed in one-eighth of one slip-cycle, this period being that during which the alternating synchronising torque is unidirectional.

It is evident, then, that there is an optimum division of the cubic content of a given size of motor between starting torque material and synchronous torque material, so that there is a relative deficiency of neither starting nor synchronous torques.

The operation of the motor during acceleration from standstill to synchronism may be considered in two stages.

During the first stage, the machine operates as an induction motor and accelerates from standstill to a sub-synchronous speed dependent upon the load applied.

In the second stage, the alternating torque, due to the variation in the reluctance of the magnetic circuit during slip, having become of sufficiently long periodicity, the unidirectional synchronising torque developed during a quarter of a slip cycle is of sufficient continuous duration to accelerate the rotor and load to synchronous speed. In one unique case, it is possible for the rotor to reach synchronous speed at the precise instant when it has the required displacement with respect to the flux to develop the torque required by the load; but, neglecting this condition, which occurs only by chance, the rotor, in general, is accelerated to a speed above synchronous speed, overshoots its stable position, falls back, re-accelerates, and so on, the amplitude of oscillation gradually dying down due to losses until a stable position is adopted.

During the first of these two stages, the torque varies with the speed in a manner which depends on the design of the rotor winding, but for a given winding, and with all other conditions remaining constant, the torque at any one speed will be decreased if the reluctance presented to the flux is increased. This is because the flux is decreased on account of the extra voltage drop in the windings caused by the current which flows to compensate for the added reluctance. However, the relative values of the torques at any two speeds will be substantially unaffected.

During the second stage, the average torque is proportional to the total change of reluctance presented to the flux when the rotor is deflected from alignment with the flux by half a pole pitch. The average torque is, therefore, also proportional to the average increase in reluctance presented to the flux when the motor is running synchronously.

It is evident that torque during the second stage can only be obtained at the expense of torque during the first stage. Since the same load must be driven during both stages, it follows that the maximum output from a given size of machine is obtained when the effective torques during the two stages are equal. It is thus necessary to ensure, in construction of the motor, that the total change in reluctance presented to the flux as the rotor passes through a relative angle of half a pole pitch is maintained with reasonable accuracy at the optimum value.

It would appear from the above that, in a non-self-starting synchronous motor where accelerating torque is not required, the maximum synchronous torque is obtained when the ratio of maximum to minimum reluctance is as great as possible. This is not so over the whole practicable range of reluctance ratio, but only in the neighbourhood of the optimum for a self-starting motor. For a non-self-starting motor the ratio is made greater, and the existence of a maximum value is the result of the effect of three factors. These factors are—

(a) Synchronous torque (increases with increase in ratio, providing the flux remains substantially constant).

(b) Total flux (decreases with increase in ratio, because increased magnetising current impedance drop decreases the effective E. M. F. applied to the motor).

(c) Heating (increases with increase of ratio owing to resultant increase of magnetising current).

According to the present invention we provide a synchronous motor of the type that operates without continuous current excitation comprising a rotor constructed of laminations of magnetic material diametrically opposite portions of the periphery of some of which have been removed the laminations being of more than one kind and each kind being unique in the angular extent of the portion of the periphery that has been removed.

This construction enables the optimum ratio of maximum to minimum reluctance to be readily obtained both for a self starting and a non-self-starting synchronous motor.

The nature of the invention will be better understood from the following description taken in conjunction with the accompanying drawings in which Figs. 1 to 4 show curves relating to a self-starting synchronous motor.

Fig. 1 shows how the torque during the first stage varies with the reluctance change;

Fig. 2 shows how the torque during the second stage varies with the change of reluctance;

Fig. 3 shows how the performance of a machine with a given change in reluctance is predicted;

Fig. 4 shows how the optimum change of reluctance is determined.

Figs. 5 to 7 are curves relating to a non-self-starting synchronous motor showing respectively the manner in which the flux varies with the reluctance ratio, the manner in which the rate of change of reluctance depends upon the reluctance ratio and the manner in which the torque developed varies with the reluctance ratio.

Fig. 8 shows one general form of the laminations in a synchronous motor according to the invention.

Fig. 9 shows how a sinusoidal rate of change of reluctance may be secured.

Fig. 10 shows a rotor of a synchronous motor according to the invention built up of laminations shown in Fig. 8.

Fig. 11 shows the rotor of Fig. 10 provided with self-starting windings.

Figs. 12 and 13 show two other forms which the laminations may take according to the invention.

Referring to Fig. 1, a number of curves show in the case of a self-starting synchronous motor the torque speed characteristic for different values of average of reluctance during the first of the two stages referred to above. Each value of reluctance corresponds to a particular ratio of maximum to minimum reluctance. The curve marked "1" corresponds to a ratio of 1:1, that marked "2" corresponds to a ratio of 2:1, and so on.

Fig. 2 shows the torque available for external utilisation during the synchronising process at any given slip frequency, for various ratios of maximum to minimum reluctance.

Fig. 3 shows two corresponding curves of Figs. 1 and 2 superimposed so that the output of the machine for the reluctance ratio to which the curves relate is indicated at their point of intersection.

Fig. 4 shows all the possible editions of Fig. 3 superimposed, a heavy line being drawn through the locus of the point of intersection. This locus thus indicates the output of the machine, the maximum value of which occurs where the vertical ordinate of the locus curve is a maximum. The value of the reluctance ratio for this output may be read off by observing between which points of intersection the maximum occurs; for example, the curves shown would indicate an optimum ratio of maximum to minimum reluctance of approximately 3.7.

In the case of a non-self-starting synchronous motor, the optimum ratio of maximum to minimum reluctance may be determined as follows neglecting any heating effect:

If the stator had no resistance and leakage reactance, the flux would remain constant for all values of reluctance ratio, the necessary current flowing to maintain the flux. As the ratio is increased, however, the current increases and causes in increased impedance drop. Since the flux is proportional to the effective E. M. F. across the stator winding, the flux decreases. This is shown in Figure 5, curve A. The rate of change of reluctance depends upon the reluctance ratio, as shown in Figure 6. The torque developed is proportional to the product of the rate of change of reluctance and the second power of the flux. The curve showing the relation of the second power of the flux to the reluctance ratio is shown in curve B, Fig. 5 whilst the resulting relationship of the torque to the reluctance ratio is of the kind shown in Fig. 7, in which maximum torque is developed for a particular value of the reluctance ratio.

It is possible that, in some cases, the current corresponding to the reluctance ratio determined as described above, would result in a temperature rise in excess of the permitted value. The ratio would then be adjusted so that the current for full load torque produces the desired temperature rise.

In order to realise this change of reluctance in the case of either form of motor a variable air gap area is provided in conjunction with a constant air gap length, the variable area being a result of the use of rotor laminations of more than one kind.

One shape that the laminations may take according to the invention is shown in Fig. 8. The rotor is then built up of more than one kind of laminations, all the kinds being of the shape shown but differing in the angle $\theta$, which may vary from zero to $\pi$ radians. The radial depth $a$ of the portion cut away is not critical and it is sufficient if this depth is large enough to prevent small variations in the depth from influencing the reluctance across the lamination appreciably. It is evident that the area of the air gap between stator and rotor is easily maintained with only moderately narrow limits on the dimensions.

It is preferable that the rate of change of reluctance around the rotor should be sinusoidal in order that the synchronising effort should be a maximum. Fig. 9 is a development of the air gap of a two-pole motor showing how an approximately sinusoidal rate of change of reluctance may be obtained with only three kinds of lamination of the shape shown in Fig. 8. Fig. 10 is a perspective view of such a rotor.

Figs. 12 and 13 show other forms that the laminations may take.

It is evident that if a rotor, constructed as in Fig. 10 were fitted with a squirrel cage of the well known type to render it self-starting, a considerable number of the copper bars would extend from the magnetic material which they traverse to the end ring. This extended part of each bar, if of the same diameter as that part of the bar embedded in the magnetic material, would offer unnecessary resistance to currents in the bar. In cases where an unusually low resistance rotor winding is desirable, it is possible to take advantage of the rotor formation shown in Fig. 10, by terminating the bars close to the point where they emerge from the magnetic material, and extending the end ring inwards to co-operate with the shortened bar. A rotor so arranged is depicted in Fig. 11, where the end rings 1 are inwardly extended as at 2 to be joined to the shortened bars 3.

What is claimed is:

1. A synchronous motor of the type described comprising a rotor constructed of laminations of magnetic material, including laminations having diametrically opposite portions of the periphery thereof removed to provide segmental polar extension portions of the rotor having progressively widened spacing, a squirrel cage winding incorporated therewith and end rings bonded with the windings and formed complemental to the lamination spacing thereby to provide a rotor having a sinusoidal change of reluctance around its periphery.

2. A synchronous motor of the type described comprising a rotor constructed of at least three forms of laminations of magnetic material, two of said forms having diametrically opposite portions of the periphery thereof removed to provide segmental polar extension portions of the rotor of progressively widened spacing, squirrel cage winding incorporated therewith formed of bars substantially coextensive axially with the full diameter portions of the rotor and end rings bonded with the bars and formed to extend into the lamination spacing thereby to provide a rotor having a sinusoidal change of reluctance around its periphery.

3. A synchronous motor of the type described comprising a rotor constructed of at least three forms of laminations of magnetic material, two of said forms having diametrically opposite portions of the periphery thereof removed to provide segmental polar extension portions of the rotor of progressively widened spacing at opposite ends of the rotor, squirrel cage winding incorporated therewith formed of bars substantially coextensive axially with the full diameter portions of the rotor and end rings bonded with the bars and formed to extend into the lamination spacing thereby to provide a rotor having a sinusoidal change of reluctance around its periphery.

FREDERICK PERCIVAL MASON.